(12) United States Patent
Yamauchi

(10) Patent No.: US 10,795,559 B2
(45) Date of Patent: Oct. 6, 2020

(54) DATA POSITIONING METHOD, DATA POSITIONING APPARATUS, AND COMPUTER PROGRAM

(71) Applicant: YAMAHA CORPORATION, Hamamatsu-shi (JP)

(72) Inventor: Akira Yamauchi, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 46 days.

(21) Appl. No.: 15/467,512

(22) Filed: Mar. 23, 2017

(65) Prior Publication Data

US 2017/0277414 A1 Sep. 28, 2017

(30) Foreign Application Priority Data

Mar. 24, 2016 (JP) ................................. 2016-059467

(51) Int. Cl.
| | | |
|---|---|---|
| *G06F 3/0484* | (2013.01) | |
| *G06F 16/64* | (2019.01) | |
| *G10L 21/12* | (2013.01) | |

(52) U.S. Cl.
CPC .......... *G06F 3/04845* (2013.01); *G06F 16/64* (2019.01); *G10L 21/12* (2013.01); *G06F 2203/04803* (2013.01)

(58) Field of Classification Search
CPC ........................... G06F 17/30775; G06F 3/048
See application file for complete search history.

(56) References Cited

U.S. PATENT DOCUMENTS

| 6,541,687 B1 | 4/2003 | Miyamoto |
|---|---|---|
| 7,177,795 B1 | 2/2007 | Chen et al. |
| (Continued) | | |

FOREIGN PATENT DOCUMENTS

| EP | 2161715 A2 | 3/2010 |
|---|---|---|
| JP | H11296175 A | 10/1999 |
| (Continued) | | |

OTHER PUBLICATIONS

Extended European Search Report issued in European Appln. No. 17162507.2 dated Jul. 3, 2017.
(Continued)

*Primary Examiner* — Liang Y Li
(74) *Attorney, Agent, or Firm* — Rossi, Kimms & McDowell LLP

(57) ABSTRACT

A data positioning method includes obtaining positional information indicating a position which is designated by operation of an operation unit in any region among a plurality of regions, each of the plurality of regions corresponding to a predetermined direction along which values of a series of pieces of data are varied and being provided for designating a position of the series of pieces of data in the predetermined direction, and the plurality of regions include at least one region for designating a plurality of discrete positions of the series of pieces of data in the predetermined direction. The method further includes determining the position for designating a portion of data corresponding to the obtained positional information, any one position being determined among the plurality of discrete positions when positional information indicating a position in the region for designating the discrete positions is obtained.

18 Claims, 9 Drawing Sheets

(56) References Cited

U.S. PATENT DOCUMENTS

| | | | |
|---|---|---|---|
| 9,286,383 B1 * | 3/2016 | Robinson | G06F 16/683 |
| 2010/0057734 A1 | 3/2010 | Miyajima | |
| 2010/0278504 A1 * | 11/2010 | Lyons | G06F 3/0481 |
| | | | 386/278 |
| 2011/0258547 A1 * | 10/2011 | Symons | G06F 3/04817 |
| | | | 715/723 |
| 2012/0210221 A1 | 8/2012 | Khan | |
| 2012/0300950 A1 | 11/2012 | Usui et al. | |
| 2013/0120313 A1 * | 5/2013 | Sakuragi | G06F 3/0488 |
| | | | 345/174 |
| 2014/0258854 A1 * | 9/2014 | Li | G06F 3/0484 |
| | | | 715/702 |
| 2016/0070429 A1 * | 3/2016 | Clark | G06F 3/0482 |
| | | | 715/784 |

FOREIGN PATENT DOCUMENTS

| | | | |
|---|---|---|---|
| JP | 2000148149 A | 5/2000 | |
| JP | 2012247957 A | 12/2012 | |

OTHER PUBLICATIONS

Office Action issued in Japanese Appln. No. 2016-059467 dated Dec. 24, 2019. English machine translation provided.

Office Action issued in European Appln. No. 17162507.2 dated Aug. 11, 2020.

\* cited by examiner

DATA POSITIONING METHOD, DATA POSITIONING APPARATUS, AND COMPUTER PROGRAM

CROSS REFERENCE TO RELATED APPLICATION

This application is based upon and claims the benefit of priority of Japanese Patent Application No. 2016-059467 filed on Mar. 24, 2016, the contents of which are incorporated herein by reference in its entirety.

BACKGROUND OF THE INVENTION

1. Field of the Invention

The present invention relates to a data positioning method, a data positioning apparatus and a computer program, which determine a position for designating a portion of data included in a series of pieces of data which are stored in a storage device and have values varying along a predetermined direction.

2. Description of the Related Art

A portion of data included in a series of pieces of data, which are stored in a storage device and have values varying along a predetermined direction, is often cut out by designating the positions of the series of pieces of data in the predetermined direction. For example, it is known that a start point position and an end point position of sampled audio waveform data are designated, and the audio waveform data over a section from the start point position to the end point position is cut out, thereby repeatedly reproducing the cut-out audio waveform data, analyzing the cut-out audio waveform data, modifying music elements (pitch, frequency characteristics, and sound volume) of the cut-out audio waveform data, or mixing a plurality of cut-out pieces of audio waveform data.

In this case, in the cut-out of a portion of data in the series of pieces of data, data is displayed on a display screen, and a start point position and an end point position of cut-out section are designated on the display screen by using a pointer, as disclosed in JP-A-2012-247957 as Patent Document 1. Specifically, in the cut-out of audio waveform data, audio waveform data is displayed on a display screen, and a start point position and an end point position are designated with respect to a waveform (instantaneous value) which is displayed on the display screen by using a pointer, thereby designating a cut-out section of the audio waveform data.

Patent Document 1: JP-A-2012-247957

SUMMARY OF THE INVENTION

However, in the above-described method, a user needs to designate a desired specific position every time at the time of cutting out data, and the user has to designate the specific position on a display screen with a high level of accuracy, which results in a problem that much effort and time are required to designate the specific position, that is, to cut out data. As in the above-described method, in a case where data stored in a storage device is audio waveform data, it is general to designate an onset timing of each sound signal in the audio waveform data, which indicates a timing at which the waveform signal rises, a beat timing indicating a beat position in the progress of music, a starting timing of a main part subsequent to a prelude (or intro) part in the progress of music, and the like as specific positions. However, it is extremely difficult to simply designate positions on audio waveform data which correspond to the various timings with a high level of accuracy by simple visual determination of the audio waveform data, and much effort and time are required to designate a specific position of a portion of audio waveform data, that is, to cut out a portion of audio waveform data.

An aspect of the present invention provides a data positioning method of determining a position for designating a portion of data included in a series of pieces of data which have values varying along a predetermined direction, the data positioning method including: obtaining positional information indicating a position which is designated by operation of an operation unit in any region among a plurality of regions, wherein each of the plurality of regions corresponds to the predetermined direction and is provided for designating a position of the series of pieces of data in the predetermined direction, and the plurality of regions include at least one region for designating a plurality of discrete positions of the series of pieces of data in the predetermined direction; and determining the position for designating the portion of data corresponding to the obtained positional information, wherein any one position is determined among the plurality of discrete positions when positional information indicating a position in the region for designating the discrete positions is obtained.

DETAILED DESCRIPTION OF THE EXEMPLARY EMBODIMENTS

Figure 1:
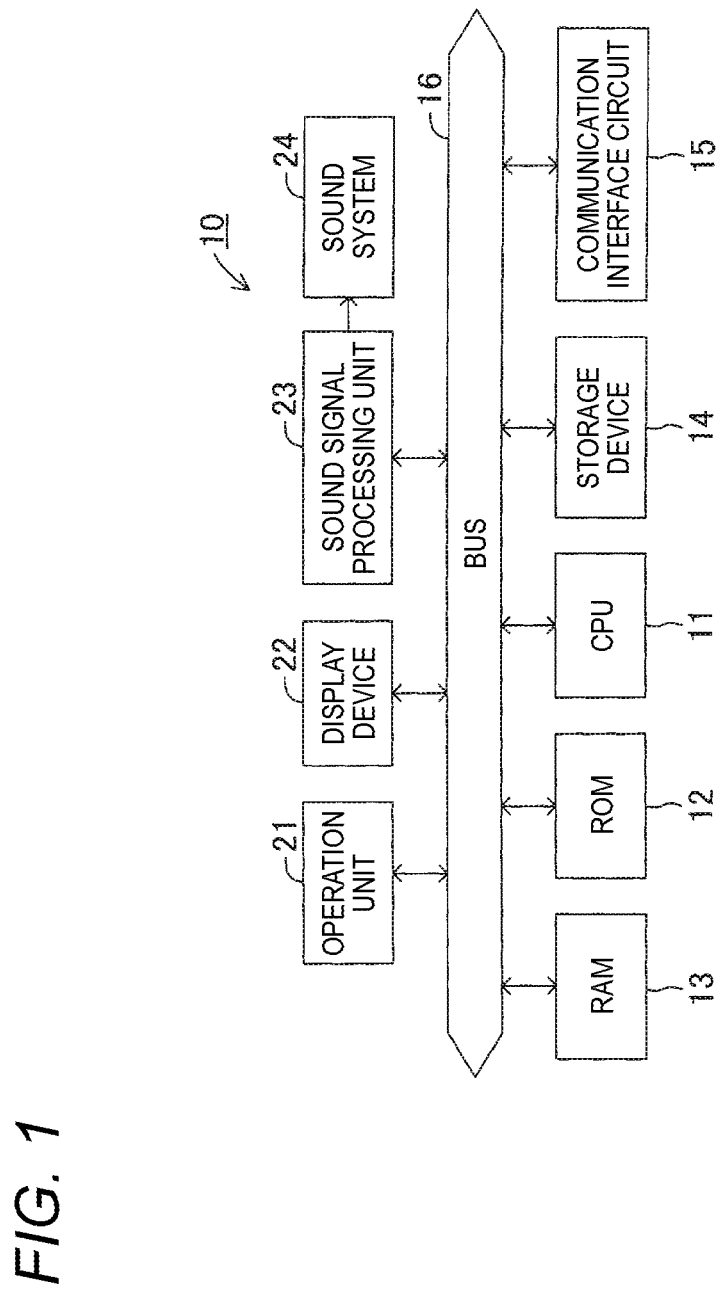
FIG. 1 is a schematic block diagram showing a hardware configuration of a data cut-out apparatus according to an embodiment of the present invention.

The present invention is contrived in order to cope with such problems, and a non-limited object of the present invention is to provide a data positioning method, a data positioning apparatus and a computer program for determining the position of data, which allows a user's desired specific position to be simply designated with a high level of accuracy. In the following description of constituting requirements of the present invention, corresponding reference numerals and signs in an embodiment are described within parentheses in order to facilitate the understanding of the present invention. However, constituting requirements of the present invention are not limited to configurations of corresponding elements denoted by the reference numerals and signs in the embodiment.

In order to achieve the above-described object of the present invention, there is provided a data positioning method of determining a position for designating a portion of data included in a series of pieces of data (WD, WD1, WD2) which have values varying along a predetermined direction, the data positioning method including a procedure (S12) of obtaining positional information indicating a position which is designated by operation of an operation unit (21) in any region among a plurality of regions (22a, 22a1, 22a2, 22b, 22b1, 22b2, 22b3), wherein each of the plurality of regions corresponds to the predetermined direction and is provided for designating a position of the series of pieces of data in the predetermined direction, and the plurality of regions include at least one region (22b, 22b1, 22b2, 22b3) for designating a plurality of discrete positions of the series of pieces of data in the predetermined direction, and a procedure (S201 to S204, S401 to S404, S507 to S510) of determining a position for designating the portion of data corresponding to the obtained positional information, wherein any one position is determined among the plurality of discrete positions when positional information indicating a position in the region for designating the discrete positions is obtained.

According to an aspect of the present invention having the above-described configuration, in the procedure of obtaining positional information, positional information indicating a position designated by the operation of an operation unit in any region among a plurality of regions is obtained. In the procedure of determining a position, a position for designating a portion of data corresponding to the obtained positional information is determined. In this case, the plurality of regions include at least one region for designating a plurality of discrete positions of a series of pieces of data in a predetermined direction, and any one position among the plurality of discrete positions is determined when positional information indicating a position in a region for designating discrete positions is obtained. Accordingly, if user's desired specific positions are set as discrete values in advance, it is extremely simple to designate the user's desired specific positions with a high level of accuracy, and much effort and time are not required to designate the specific positions, thereby allowing the specific positions to be simply designated.

A position for designating a portion of data may include, for example, at least one of a start point position (L1) and an end point position (L2) of a portion of data. Accordingly, the user can intentionally designate a section of a portion of data, which provides convenience in cutting out a portion of data.

In addition, a plurality of regions may include, for example, at least two regions (22b1, 22b2, 22b3) for designating a plurality of discrete positions of a series of pieces of data in a predetermined direction at different intervals, respectively. Accordingly, it is possible to set two or more types of discrete values of different modes as user's desired specific positions, and thus the degree of freedom in designating a specific position is increased.

In addition, a plurality of regions may correspond, for example, to a plurality of display regions of a display device (22). In this case, the data positioning method further includes a procedure of displaying a plurality of different images for designating positions of a series of pieces of data in a predetermined direction in the plurality of display regions of the display device, respectively. The procedure of obtaining positional information may include obtaining positional information indicating a position designated by the operation of an operation unit in any display region among the plurality of display regions. Meanwhile, a pointing device such as a mouse that determines a position by moving a pointer on a display screen, or a touch panel that determines a position by bringing a finger, an operation member, or the like into contact with a display screen to thereby determine a position may be used as the operation unit. Accordingly, it is possible to simply configure the display device and the operation unit and to simply obtain positional information through the procedure of obtaining positional information.

In addition, the procedure of displaying a plurality of different images includes displaying a series of pieces of data stored in a storage device in one display region among a plurality of display regions as images for designating positions of the series of pieces of data in a predetermined direction. In this case, the series of pieces of data stored in the storage device are, for example, pieces of audio waveform data which are sampled with a lapse of time. Accordingly, a user can confirm the designation of a position which is performed by the operation of an operation unit in association with a series of pieces of data (for example, audio waveform data), which provides convenience in the user's designation of a position.

In addition, a series of pieces of data stored in a storage device are pieces of audio waveform data sampled with the lapse of time, and the procedure of displaying a plurality of different images includes displaying a plurality of images for designating a plurality of discrete positions at different intervals in a plurality of display regions of a display device, respectively, so that the discrete positions are along a common time axis and have directions conforming to each other. In this case, the plurality of images displayed in the plurality of display regions of the display device are an image (MK1) indicating an onset timing of sound signal in the audio waveform data, an image (MK2) indicating a beat timing in the audio waveform data, and an image (MK3) indicating a performance sectioning timing between a main part and a prelude part or a postlude part of a musical piece. Accordingly, it is extremely easy to designate a specific position of a user's desired audio waveform data with a high level of accuracy, and much effort and time are not required to designate a specific position, thereby allowing a specific position to be simply designated. Therefore, it is possible to simply designate the position of a portion of audio waveform data in audio waveform data sampled with the lapse of time, which provides convenience in cutting out a portion of audio waveform data.

Further, the present invention is not limited to the data positioning method in implementing the present invention, and may be implemented as a data positioning apparatus and a computer program for determining the position of data.

Hereinafter, a configuration of a data cut-out apparatus 10 according to an embodiment of the present invention will be described with reference to the accompanying drawings. The data cut-out apparatus 10 is implemented by a general personal computer device, as shown in FIG. 1. The data cut-out apparatus 10 includes a CPU 11, a ROM 12, and a RAM 13 for executing program processing, and further includes a storage device 14 and a communication interface circuit 15.

The storage device 14 includes a large-capacity writable recording medium, such as a flash memory or a compact disc (CD), and a drive circuit that drives the recording medium.

The storage device 14 stores programs to be used for the cut-out of data (see FIGS. 2 to 7), parameters (data) necessary for the cut-out of data, a plurality of pieces of audio waveform data, and the like, and stores data indicating results of program processing. In a case where the programs, the parameters (data), the pieces of audio waveform data, and the like are not stored in the storage device 14, the storage device 14 obtains and stores necessary programs and parameters (data) from the outside through the communication interface circuit 15. The audio waveform data is obtained by sampling a sound signal, obtained by recording the performance of a musical instrument, a singer's singing voice, or the like, over a predetermined period of time. Alternatively, the audio waveform data may be a digital sound signal indicating a synthesized sound signal over a predetermined period of time. The audio waveform data may be input from the outside through the communication interface circuit 15, or may be generated by the data cut-out apparatus 10. The communication interface circuit 15 is constituted by a MIDI interface circuit, an internet connection circuit, or the like, and performs communication with an external device.

The CPU 11, the ROM 12, the RAM 13, the storage device 14, and the communication interface circuit 15 are connected to a bus 16. An operation unit 21, a display device 22, and a sound signal processing unit 23 are also connected to the bus 16.

The operation unit 21 includes a keyboard constituted by a plurality of operation buttons to be operated by a user, a mouse constituting a pointing device, and the like. The display device 22 is constituted by a liquid crystal display device, an LED display device, or the like, and includes a two-dimensional display screen. The sound signal processing unit 23 performs signal processing of supplied audio waveform data, and supplies a sound signal having been subjected to signal processing to a sound system 24. The sound system 24 includes an amplifier, a speaker, and the like, and utters a sound signal supplied from the sound signal processing unit 23 to the outside as a sound. In addition, a microphone not shown in the drawings is connected to the sound signal processing unit 23, and the sound signal processing unit is also capable of receiving an input of a piece of music from the outside and converting the input music into audio waveform data.

Next, an operation of cutting out audio waveform data which is performed by the data cut-out apparatus 10 will be described with reference to flowcharts of FIGS. 2 to 7. When a user operates a keyboard or a mouse of the operation unit 21 to give an instruction for starting to cut out data, the CPU 11 starts to execute a main program for cutting out data in step S10 of FIG. 2. After the execution of the main program is started, the CPU 11 starts to execute an initial setting processing routine in step S11.

Figure 3:
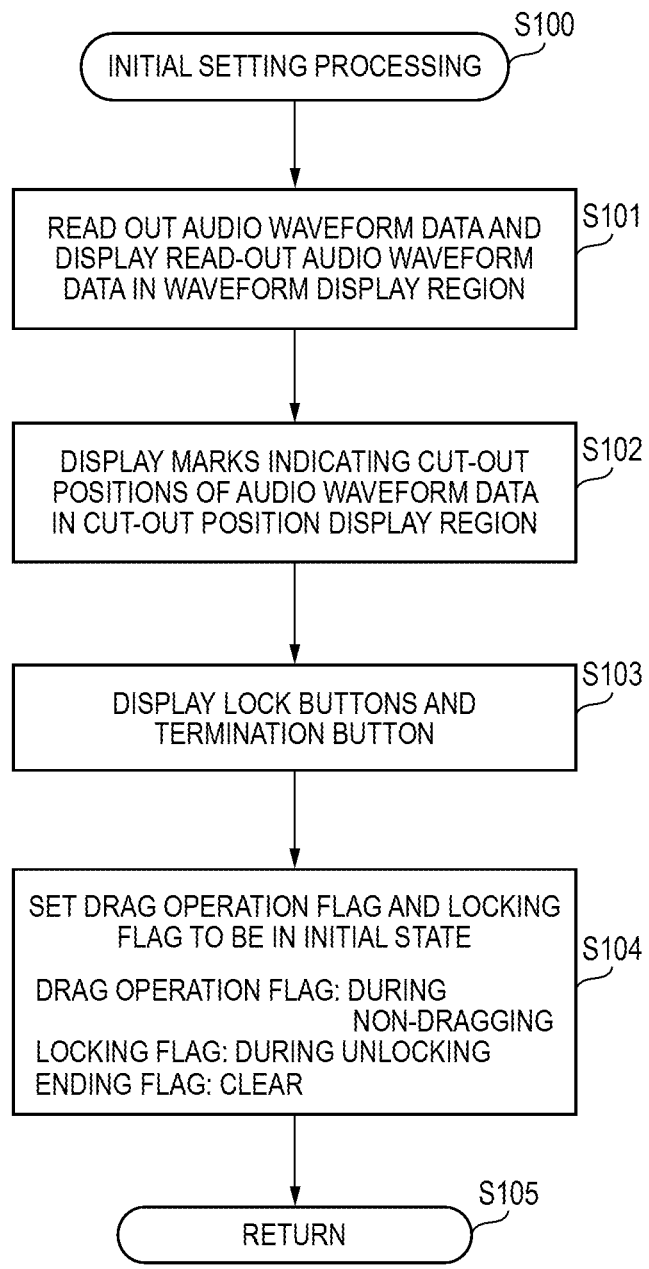
FIG. 3 is a flowchart showing an initial setting processing routine of the main program.

Details of the initial setting processing routine are shown in FIG. 3, and the execution thereof is started in step S100. After the execution of the initial setting processing routine is started, the CPU 11 reads out audio waveform data WD stored in the storage device 14 and writes the read-out data in the RAM 12 in step S101, and displays the audio waveform data WD written in the RAM 12 on the display device 22. In this case, a user causes the display device 22 to display a title (name) regarding a plurality of pieces of audio waveform data stored in the storage device 14, and operates the keyboard, the mouse, or the like of the operation unit 21 to thereby select desired audio waveform data WD among a plurality of pieces of audio waveform data.

Figure 8:
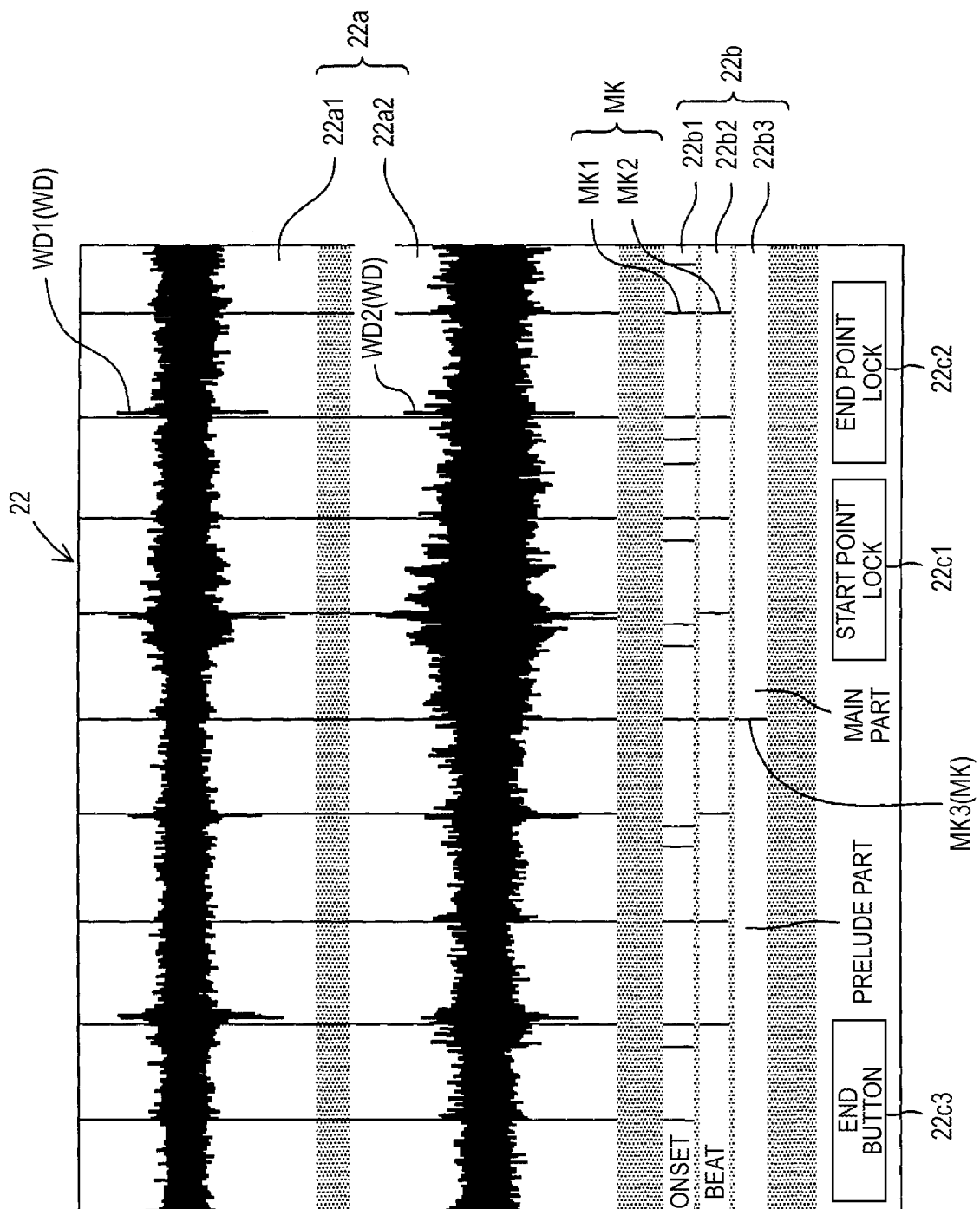
FIG. 8 is a schematic diagram showing an example of a display state of a display device.

FIG. 8 shows an example in which two pieces of right and left 2-channel audio waveform data WD1 and WD2 are selected, and the selected two pieces of audio waveform data WD1 and WD2 are respectively displayed in two waveform display regions 22a1 and 22a2 provided on a display screen of the display device 22 by linearly extending a time axis in a right-left direction. However, only one waveform display region 22a may be provided on the display screen of the display device 22, and only one piece of audio waveform data WD may be displayed in one waveform display region 22a. In addition, without selecting audio waveform data WD by a user, predetermined audio waveform data WD (for example, the next cut-out audio waveform data WD among a plurality of pieces of audio waveform data stored in the storage device 14 in a predetermined order) may be automatically read out and may be displayed in the waveform display region 22a.

Next, the CPU 11 displays marks MK indicating a plurality of cut-out positions of audio waveform data WD in the cut-out position display lane (cut-out position display region) 22b in step S102. The cut-out position display lane 22b is provided at a position different from the waveform display region 22a on the display screen of the display device 22, and is provided along a time axis common to the waveform display region 22a and in a consistent direction, that is, is provided by extending a time axis common to the waveform display region 22a in a right-left direction (parallel to the time axis of the waveform display region 22a). The cut-out positions are a plurality of discrete timing positions in a direction of a time axis of audio waveform data WD. Specifically, the cut-out positions are an onset timing which indicates a timing at which the sound signal rises in the audio waveform data WD, a beat timing in the audio waveform data WD, a performance sectioning timing which is a timing of sectioning between a main part and a prelude (or intro) part or a postlude part of a musical piece, and the like. FIG. 8 shows an example in which a mark MK1 indicating an onset timing, a mark MK2 indicating a beat timing, and a mark MK3 indicating a performance sectioning timing are displayed in three cut-out position display lanes 22b1, 22b2, and 22b3 provided below the waveform display regions 22a1 and 22a2 on the display screen of the display device 22.

A plurality of cut-out positions of audio waveform data WD which indicate positions of marks MK displayed in the cut-out position display lane 22b are determined by, for example, the following methods (1) to (3).

(1) Positional information indicating cut-out positions which are determined by the methods (2) and (3) and are stored in advance in the storage device 14 in association with pieces of audio waveform data WD is read out, and a cut-out position is determined using the read-out positional information. In addition, a cut-out position may be determined at a point in time different from those in (2) and (3), for example, during the recording of a sound signal for forming audio waveform data WD, and positional information indicating the cut-out position may be stored in the storage device 14.

(2) A cut-out position is determined by executing a program for automatically analyzing read-out audio waveform data WD. In this case, varying in an instantaneous value (amplitude value) of audio waveform data WD with the lapse of time is analyzed to thereby detect an onset timing of each sound and determine a cut-out position. In addition, an interval between the onset timings, varying in the magnitude of an instantaneous value of audio waveform data WD at an onset timing, a repetition state thereof, and the like are analyzed to thereby determine cut-out positions indicating a beat timing and a performance sectioning timing.

(3) A user designates the position of a displayed waveform in an axial direction by operating the keyboard or the mouse of the operation unit 21 while viewing audio waveform data WD displayed in the waveform display region 22a, thereby performing manual setting. In this case, the user may determine the position of a displayed waveform in an axial direction to be a cut-out position while enlarging the waveform or observing the entire waveform over a predetermined period of time.

Meanwhile, results of the positioning in (2) and (3) described above are stored in the storage device 14 in association with read-out audio waveform data, and thus the above-described method (1) can be adopted in a case where a cut-out position of the audio waveform data WD is determined again in the future.

Next, in step S103, the CPU 11 displays a start point lock button 22c1 for giving an instruction for locking a start point position, an end point lock button 22c2 for giving an instruction for locking an end point position, and an end button 22c3 for giving an instruction for ending a program, that is, ending the cut-out of audio waveform data WD, at a position below the cut-out position display lane 22b on the display screen of the display device 22. After the process of step S103 is performed, a flag used in first and second operation modes during the processing of the program is set to be in an initial state, and an end flag is cleared in step S104.

The first operation mode is an operation mode in which a start point position and an end point position in a cut-out section of data are determined by an operation of dragging a mouse. In the first operation mode, a drag operation flag is used. The drag operation flag indicates a state in which a button of a mouse is pressed by "during dragging", and indicates a state where the pressing of the button is canceled by "during non-dragging". In this case, the drag operation flag is initialized to a value indicating "during non-dragging". The second operation mode is an operation mode in which one of the determined start point position and end point position of the cut-out section of the data is locked, and the other is corrected. In the second operation mode, a locking flag is used. The locking flag indicates a state where the start point position is locked by "during locking of start point", indicates a state where the end point position is locked by "during locking of end point", and indicates a state where neither the start point position nor the end point position is locked by "during unlocking". In this case, the locking flag is initialized to a value indicating "during unlocking".

Figure 2:
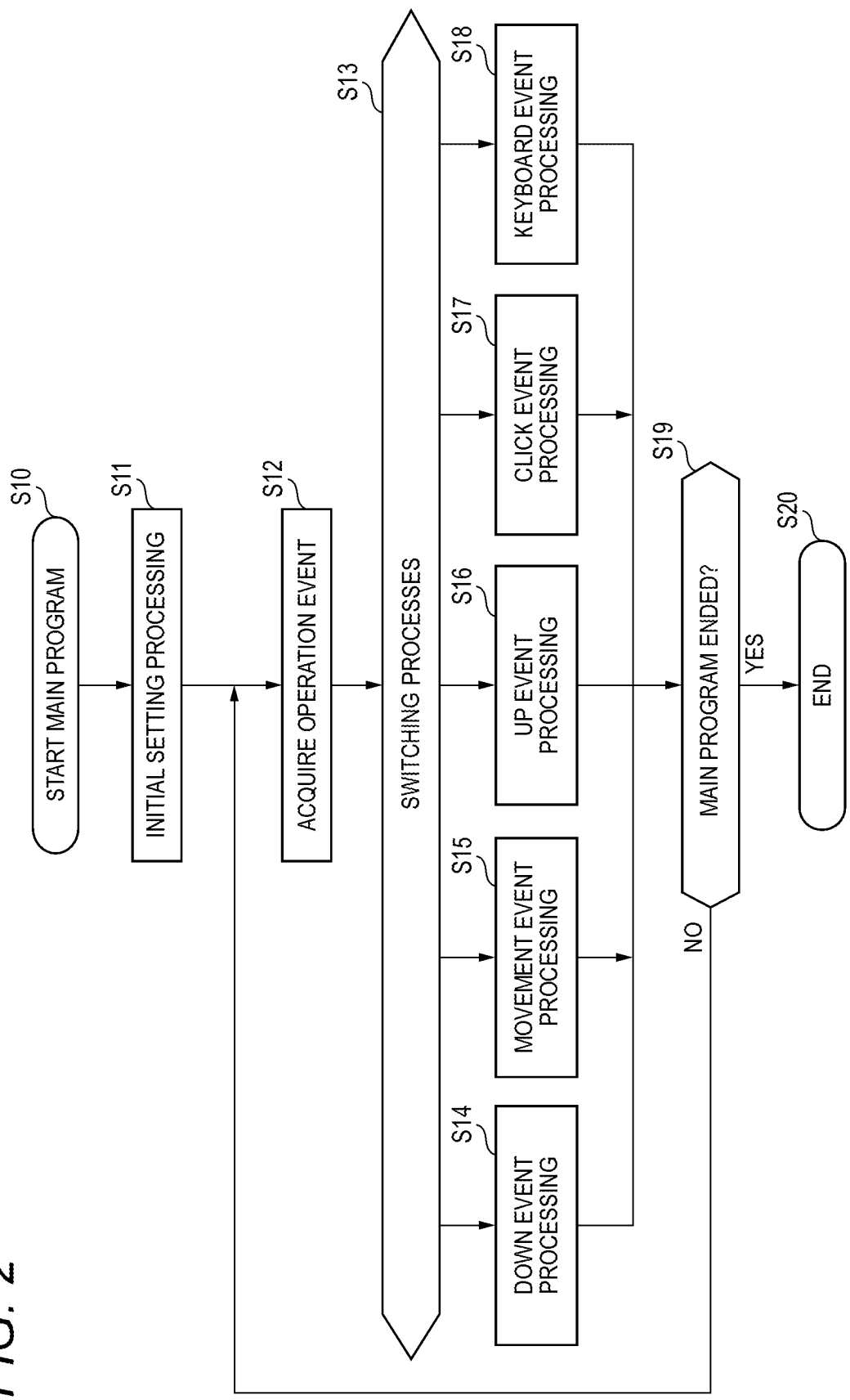
FIG. 2 is a flowchart showing a main program for data cut-out which is executed by a computer device as the data cut-out apparatus.

After the process of step S104 is performed, the CPU 11 returns to the execution of the main program of FIG. 2 by the process of step S105 to perform the process of step S12. In step S12, the CPU 11 detects a user's operation of the keyboard and the mouse of the operation unit 21 to thereby acquire an operation event related to the detected operation of the keyboard and the mouse. In particular, the operation event includes positional information regarding a cursor on the display screen of the display device 22 based on the movement of the mouse and includes a drag operation (start of dragging, during dragging, end of dragging) and a click operation which are operation modes of the mouse.

Thereafter, the CPU 11 performs a switching process based on the operation event acquired in step S13 to execute any event processing routine of steps S14 to S18. After the processes of steps S14 to S18 are performed, the ending of a main program is determined on the basis of an end flag in step S19. The end flag is cleared by the process of step S104 of the initial setting processing routine S11 in the initial state. The CPU 11 determines "No" in step S19 as long as the end flag is not set to a value indicating the ending of data cut-out by a process to be described later, and the CPU return to the process of step S12 to repeatedly execute circulation processing of steps S12 to S19. When the end flag is set to a value indicating the ending of data cut-out, the CPU 11 determines "Yes" in step S19 to ends the main program in step S20.

First, a description will be given of the first operation mode in which a start point position and an end point position of a cut-out section of data by an operation of dragging a mouse. When a user presses a button of the mouse to start a drag operation during the circulation processing of steps S12 to S19, an operation event related to an operation of pressing the button (hereinafter, referred to as a down operation) which is accompanied by the start of the operation of dragging the mouse is acquired in step S12, and the CPU 11 progresses the execution of a program to a down event processing routine of step S14 by the switching process of step S13. The down event processing routine is started in step S200 as shown in a flowchart of FIG. 4 in detail. In step S201, the CPU 11 switches processing on the basis of positional information regarding a cursor on the display screen of the display device 22 which is included in an operation event when a down operation of a mouse is performed.

When the cursor is positioned in the waveform display region 22a based on the down operation of the mouse, the CPU 11 progresses the program to step S202 to calculate a position on the time axis which corresponds to the position of the cursor in the waveform display region 22a in step S202. On the other hand, when the cursor is positioned in the cut-out position display lane 22b based on the down operation of the mouse, the CPU 11 progresses the program to step S203 to calculate a position on the time axis which corresponds to the position of the cursor in the cut-out position display lane 22b in step S203. A position on the time axis which corresponds to the position of the cursor when the down operation of the mouse is performed is calculated by the processes of steps S202 and S203. In a case where a position on the time axis is calculated by the process of step S203, the CPU 11 retrieves a cut-out position (that is, a position on the time axis at which a mark MK (MK1, MK2, MK3) is displayed) which is closest to the calculated position in the cut-out position display lane 22b in which the down operation of the mouse is performed, in step S204, to thereby correct the calculated position to a cut-out position.

Figure 9A:
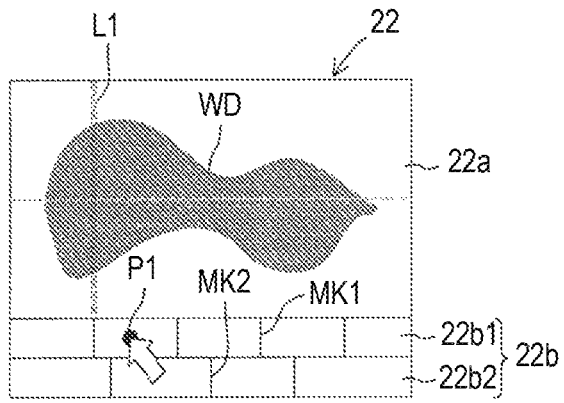
FIGS. 9A to 9E are schematic diagrams showing an example of a display state of a display device for describing a procedure of determining a cut-out position of data.

After the processes of steps S202 and S204 are performed, the CPU 11 changes the drag operation flag to a value indicating "during dragging" in step S205. Next, the CPU 11 updates the display screen of the display device 22 on the basis of the position on the time axis which is calculated by the process of step S202 or the position on the time axis which is corrected by the process of step S204, in step S206. A straight line L1 perpendicular to the time axis is displayed in the waveform display region 22a on the display screen of the display device 22 by the updating of the display screen, as shown in FIG. 9A. Meanwhile, FIGS. 9A to 9E shows a display example in which one waveform display region 22a and two cut-out position display lanes 22b1 and 22b2 having the marks MK1 and MK2 respectively indicating an onset timing and a beat timing displayed therein are provided on the display screen of the display device 22, and a point mark P1 in FIGS. 9A to 9D indicates a position at which the down operation of the mouse is performed. Meanwhile, the point mark P1 is shown in FIGS. 9A to 9D in order to describe the embodiment, and is not displayed on a screen. In addition, this display example is an example in which the down operation of the mouse is performed on the cut-out position display lane 22*b*1. However, a position at which the down operation of the mouse is performed may be any region among the waveform display region 22*a* and the cut-out position display lanes 22*b*1 and 22*b*2.

After the process of step S206 is performed, the CPU 11 determines a start point position of a cut-out section (cut-out range) to be the position on the time axis which is calculated by the process of step S202 or the position on the time axis which is corrected by the process of step S204, and stores positional information indicating the start point position in step S207. After the process of step S207 is performed, the CPU 11 ends the down event processing routine in step S208. In addition, in a case where the down operation of the mouse is performed on the display screen of the display device 22 other than the waveform display region 22*a* and the cut-out position display lane 22*b*, the CPU 11 directly progresses the program to step S208 without executing the processes of steps S202 to S207 by the switching process of step S201, to thereby end the down event processing routine in step S208.

After the down event processing routine is ended, the CPU 11 determines "No" in step S19 of FIG. 2 to continuously execute the circulation processing of steps S12 to S19 again as long as the end flag is not set to a value indicating the ending of data cut-out.

When a user performs an operation of moving a mouse (hereinafter, referred to as a drag operation) while pressing a button of the mouse during the circulation processing of steps S12 to S19, an operation event related to an operation of dragging the mouse is acquired in step S12, and the CPU 11 progresses the program to a movement event processing routine of step S15 by the switching process of step S13. The movement event processing routine is started in step S300 as shown in a flowchart of FIG. 5 in detail. The CPU 11 determines whether or not a drag operation flag indicates "during dragging" in step S301. When the drag operation flag indicates "during dragging", the CPU 11 determines "Yes" in step S301 and progresses the program to step S302 and the subsequent steps. On the other hand, when the drag operation flag does not indicates "during dragging", the CPU 11 determines "No" in step S301 and progresses the program to step S308 to end the movement event processing routine.

Figure 4:
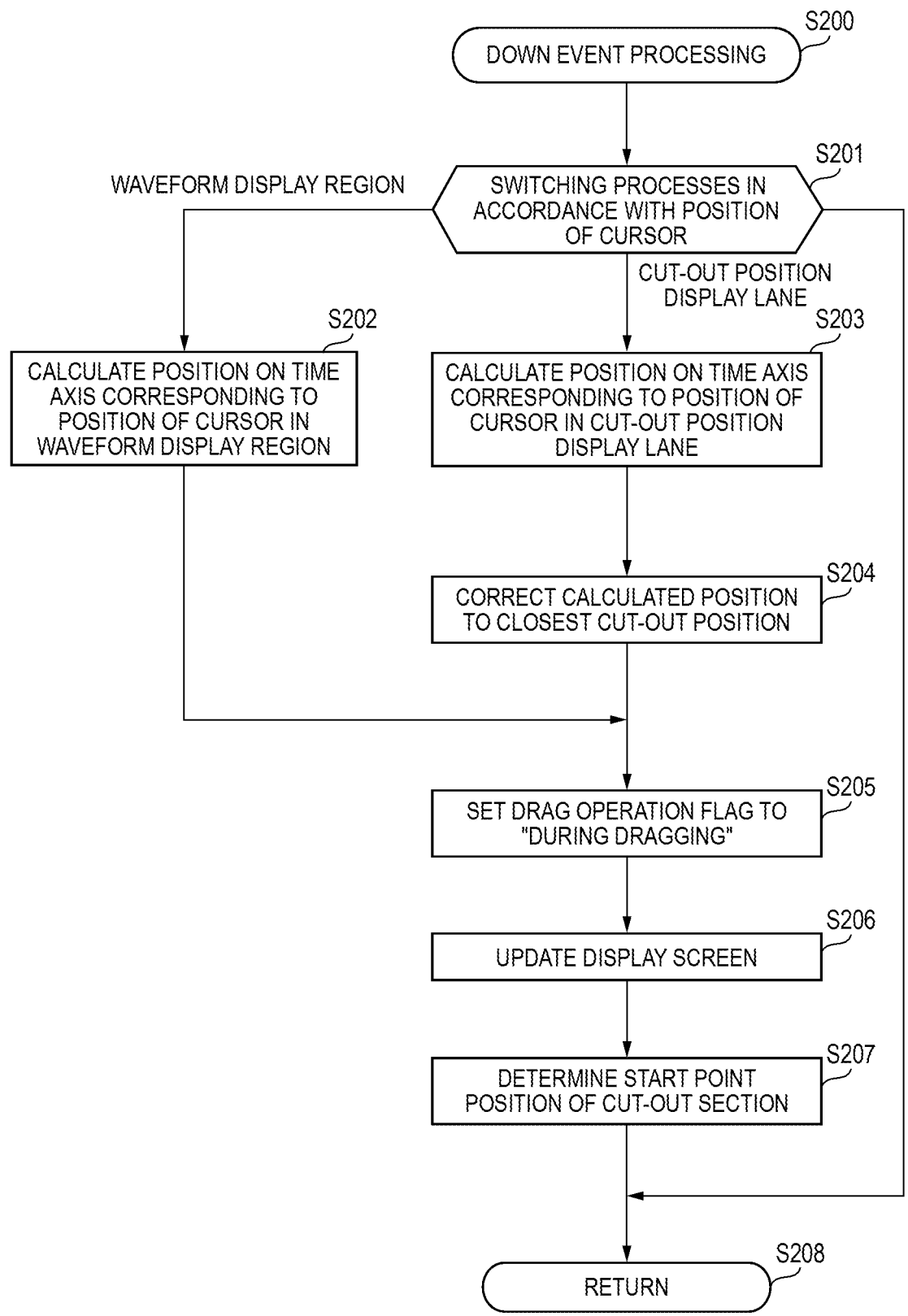
FIG. 4 is a flowchart showing a down event processing routine of the main program.
Figure 5:
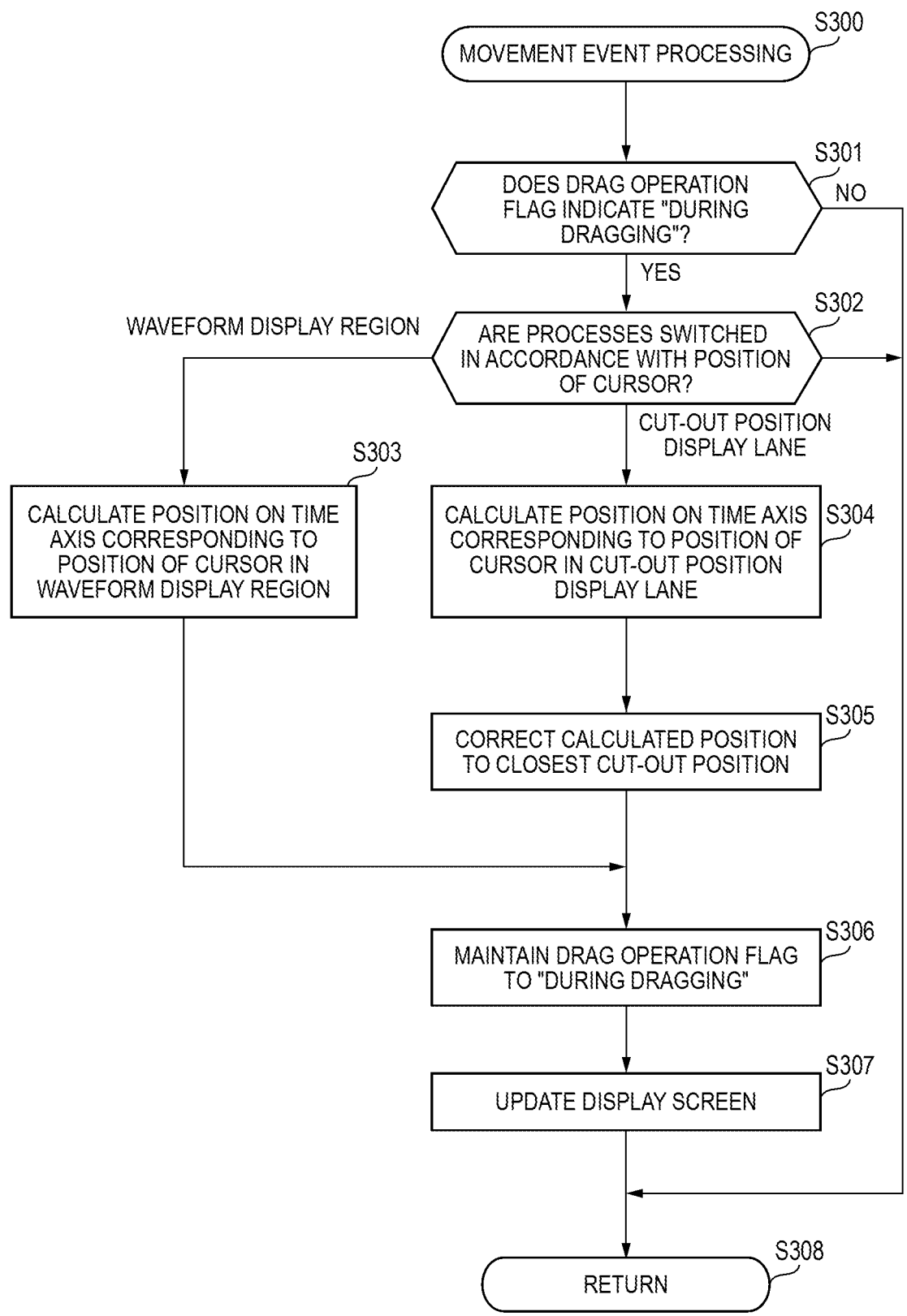
FIG. 5 is a flowchart showing a movement event processing routine of the main program.
Figure 6:
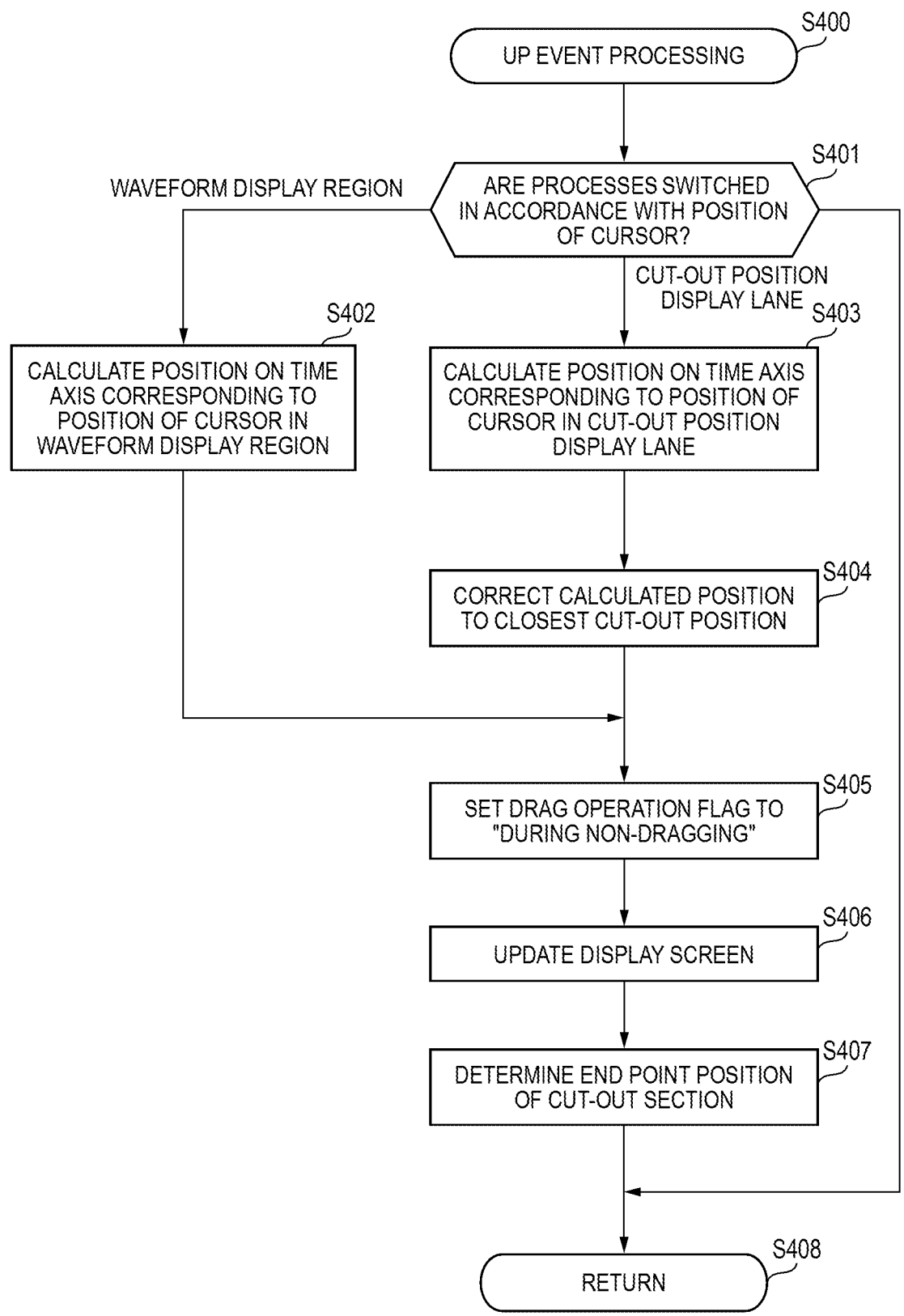
FIG. 6 is a flowchart showing an up event processing routine of the main program.

The processes of steps S302 to S305 are the same as the processes of steps S201 to S204 of FIG. 4, and are switched to the process of step S303 or the processes of steps S304 and S305 in accordance with the position of the cursor on the display screen of the display device 22 which is included in an operation event by a determination process of step S302. When the cursor is positioned in the waveform display region 22*a*, a position on the time axis which corresponds to the position of the cursor in the waveform display region 22*a* is calculated by the process of step S303. When the cursor is positioned in the cut-out position display lane 22*b*, a position on the time axis which corresponds to the position of the cursor in the cut-out position display lane 22*b* is calculated by the process of step S304. In a case of the processes of steps S303 and S304, a position on the time axis which corresponds to the position of the cursor based on the movement of the mouse is calculated. In a case where a position on the time axis is calculated by the process of step S304, a cut-out position closest to the calculated position in the cut-out position display lane 22*b* having the cursor positioned therein is retrieved by the process of step S305, and the calculated position is corrected to the retrieved cut-out position.

Figure 9D:
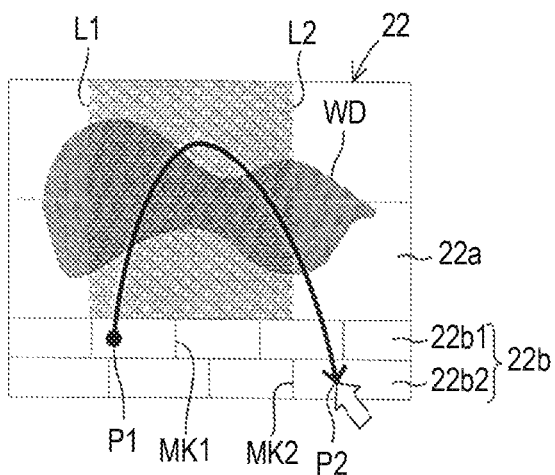

After the processes of steps S303 and S305 are performed, the CPU 11 maintains a drag operation flag in a state of "during dragging" in step S306. Next, in step S307, the CPU 11 updates the display screen of the display device 22 on the basis of the position on the time axis which is calculated by the process of step S303 or the position on the time axis which is corrected by the process of step S305. By the updating of the display screen, a square region surrounded by the straight line L1 and a straight line L2 perpendicular to the time axis is displayed in a waveform display region on the display screen of the display device 22 so as to be distinguished from other regions by a predetermined shape or color, as shown in FIGS. 9B to 9D.

Figure 9B:
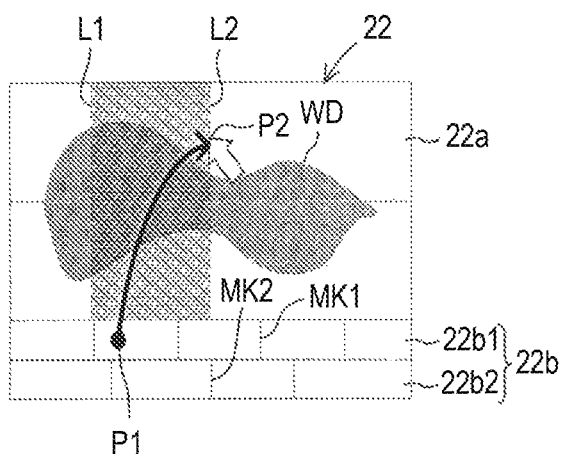
Figure 9E:
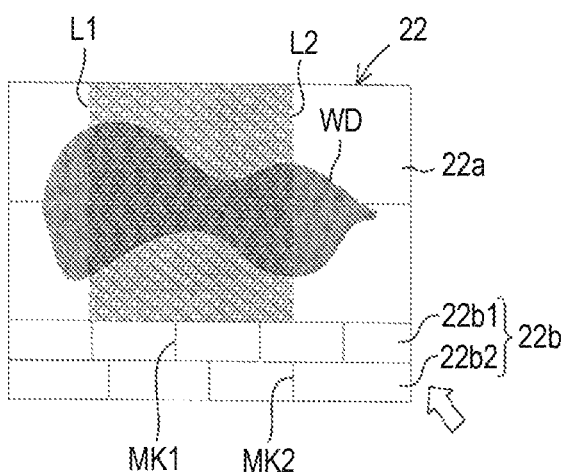
Figure 9C:
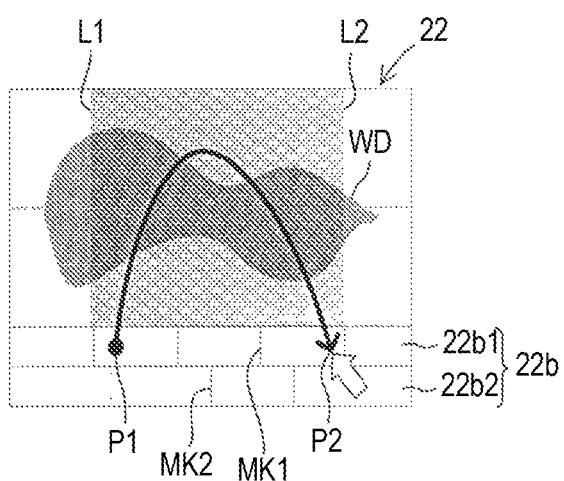

FIG. 9B shows an example in which the current position of a cursor which is indicated by a point mark P2 is on a waveform display region 22*a*, and a straight line L2 corresponds to the current position of the cursor which is indicated by the point mark P2 by the process of step S303. FIG. 9C shows an example in which the current position of the cursor which is indicated by the point mark P2 is on a cut-out position display lane 22*b*1, and the straight line L2 corresponds to a discrete cut-out position (position of a mark MK1) which is closest to the point mark P2. FIG. 9D shows an example in which the current position of the cursor which is indicated by the point mark P2 is on a cut-out position display lane 22*b*2, and the straight line L2 corresponds to a discrete cut-out position (position of the mark MK2) which is closest to the point mark P2. FIGS. 9B to 9D show a movement path between the point mark P1 and the point mark P2 of the cursor which is indicated by an arrow. Meanwhile, the point mark P2 and an arrow on is shown in FIGS. 9B to 9D in order to describe the embodiment, and are not displayed on a screen.

After the process of step S307 is performed, the CPU 11 ends the movement event processing routine in step S308. In addition, in a case where a cursor is positioned on the display screen of the display device 22 other than the waveform display region 22*a* and the cut-out position display lanes 22*b*1 and 22*b*2, the CPU 11 directly progresses the program to step S308 without executing the processes of steps S303 to S307 by the switching process of step S302, in step S308.

Even after the movement event processing routine is ended, the CPU 11 continuously executes the circulation processing of steps S12 to S19 again by the determination result of "No" in step S19 of FIG. 2, as described above, as long as the end flag is not set to a value indicating the ending of data cut-out.

When a user cancels the pressing of the button of the mouse to end the drag operation during the circulation processing of steps S12 to S19, an operation event related to the cancellation of an operation of pressing the button (hereinafter, referred to as an up operation) which is accompanied by the ending of the operation of dragging the mouse is acquired in step S12, and the CPU 11 progresses the execution of a program to an up event processing routine of step S16 by the switching process of step S13. The up event processing routine is started in step S400 as shown in a flowchart of FIG. 6 in detail. The CPU 11 executes the process of step S401 and the subsequent processes.

The processes of steps S401 to S404 are the same as the processes of steps S201 to S204 of FIG. 4, and are switched to the process of step S402 or the processes of or steps S403 and S404 in accordance with the position of the cursor on the display screen of the display device 22 which is included in an operation event of the up-operated mouse by the determination process of step S401. When the cursor is positioned in the waveform display region 22a, the position on the time axis which corresponds to the position of the cursor in the waveform display region 22a is calculated by the process of step S402. When the cursor is positioned in the cut-out position display lane 22b, the position on the time axis which corresponds to the position of the cursor in the cut-out position display lane 22b is calculated by the process of step S403. In a case of the processes of steps S402 and S403, the position on the time axis which corresponds to the position of the cursor during the up operation of the mouse is calculated. In a case where a position on the time axis is calculated by the process of step S403, a cut-out position closest to the calculated position in the cut-out position display lane 22b at which the cursor is positioned is retrieved by the process of step S404, and the calculated position is corrected to the retrieved cut-out position.

After the processes of steps S402 and S404 are performed, the CPU 11 sets a drag operation flag to "during non-dragging" in step S405. Next, the CPU 11 updates the display screen of the display device 22 on the basis of the position on the time axis which is calculated by the process of step S402 or the position on the time axis which is corrected by the process of step S404, in step S406. By the updating of the display screen, the square region surrounded by the straight line L1 and the straight line L2 is displayed in the waveform display region 22a on the display screen of the display device 22 so as to be distinguished from other regions by a predetermined shape or color, as shown in FIG. 9E. This is an example in which the mouse is up-operated in a state where the cursor is positioned as shown in FIG. 9D.

After the process of step S406 is performed, the CPU 11 determines an end point position of a cut-out section (cut-out range) to be the position on the time axis which is calculated by the process of step S402 or the position on the time axis which is corrected by the process of S404, and stores positional information indicating the end point position in step S407. After the process of step S407 is performed, the CPU 11 ends the up event processing routine in step S408. Thereby, a cut-out section (cut-out range) of audio waveform data is determined to be a time axis region between the start point position and the end point position. In addition, in a case where the mouse is up-operated on the display screen of the display device 22 other than the waveform display region 22a and the cut-out position display lane 22b, the CPU 11 directly progresses the program to step S408 without executing the processes of steps S402 to S407 to step S408 by the switching process of step S401, to thereby end the up event processing routine in step S408.

Even after the up event processing routine is ended, the CPU 11 determines "No" in step S19 of FIG. 2 to continuously execute the circulation processing of steps S12 to S19 again as long as the end flag is not set to a value indicating the ending of data cut-out. Next, a description will be given of a second operation mode in which one of a start point position and an end point position of a cut-out section of audio waveform data which are determined is locked and the other is corrected, and the ending of a data cut-out operation will also be described.

When a user clicks a mouse, that is, when the user presses a button of the mouse and cancels the pressing within an extremely short period of time after the pressing, an operation event related to the click operation of the mouse is acquired in step S12, and the CPU 11 progresses the program to a click event processing routine of step S17 by the switching process of step S13. The click event processing routine is started in step S500 as shown in a flowchart of FIG. 7 in detail. In step S501, the CPU 11 determines whether or not an end button 22c3 on the display screen of the display device 22 has been clicked. When the end button 22c3 has not been clicked, the CPU 11 determines "No" in step S501 to progress the program to step S502. In step S502, when a locking flag indicates neither "during locking of start point" nor "during locking of end point", in other words, when the locking flag is set to a value indicating "during unlocking" based on the initial setting processing of step S104, the CPU 11 determines "No" in step S502 to thereby progress the program to step S503.

In step S503, it is determined whether or not the start point lock button 22c1 on the display screen of the display device 22 has been clicked, that is, whether or not an operation event related to the click operation of the mouse indicates the clicking of the start point lock button 22c1. When the operation event indicates the clicking of the start point lock button 22c1, the CPU 11 determines "Yes" in step S503 and sets a locking flag to a value indicating "during locking of start point" in step S504, to thereby end the click event processing routine in step S515. This means that the start point position of the cut-out section of data is locked, and the end point position of the cut-out section is corrected by the next click operation on the display screen of the display device 22.

On the other hand, when the operation event does not indicate the clicking of the start point lock button 22c1, the CPU 11 determines "No" in step S503, and determines in step S505 whether or not the end point lock button 22c2 on the display screen of the display device 22 has been clicked, that is, whether or not an operation event related to a click operation of the mouse indicates the clicking of the end point lock button 22c2. When the operation event indicates the clicking of the end point lock button 22c2, the CPU 11 determines "Yes" in step S505 and sets a locking flag to a value indicating "during locking of end point" in step S506, to thereby end the click event processing routine in step S515. This means that the end point position of the cut-out section of data is locked, and the start point position of the cut-out section is corrected by the next click operation on the display screen of the display device 22. In addition, when the operation event indicates the clicking of neither the start point lock button 22c1 nor the end point lock button 22c2, the CPU 11 determines "No" in step S505 to thereby end the click event processing routine in step S515.

Figure 7:
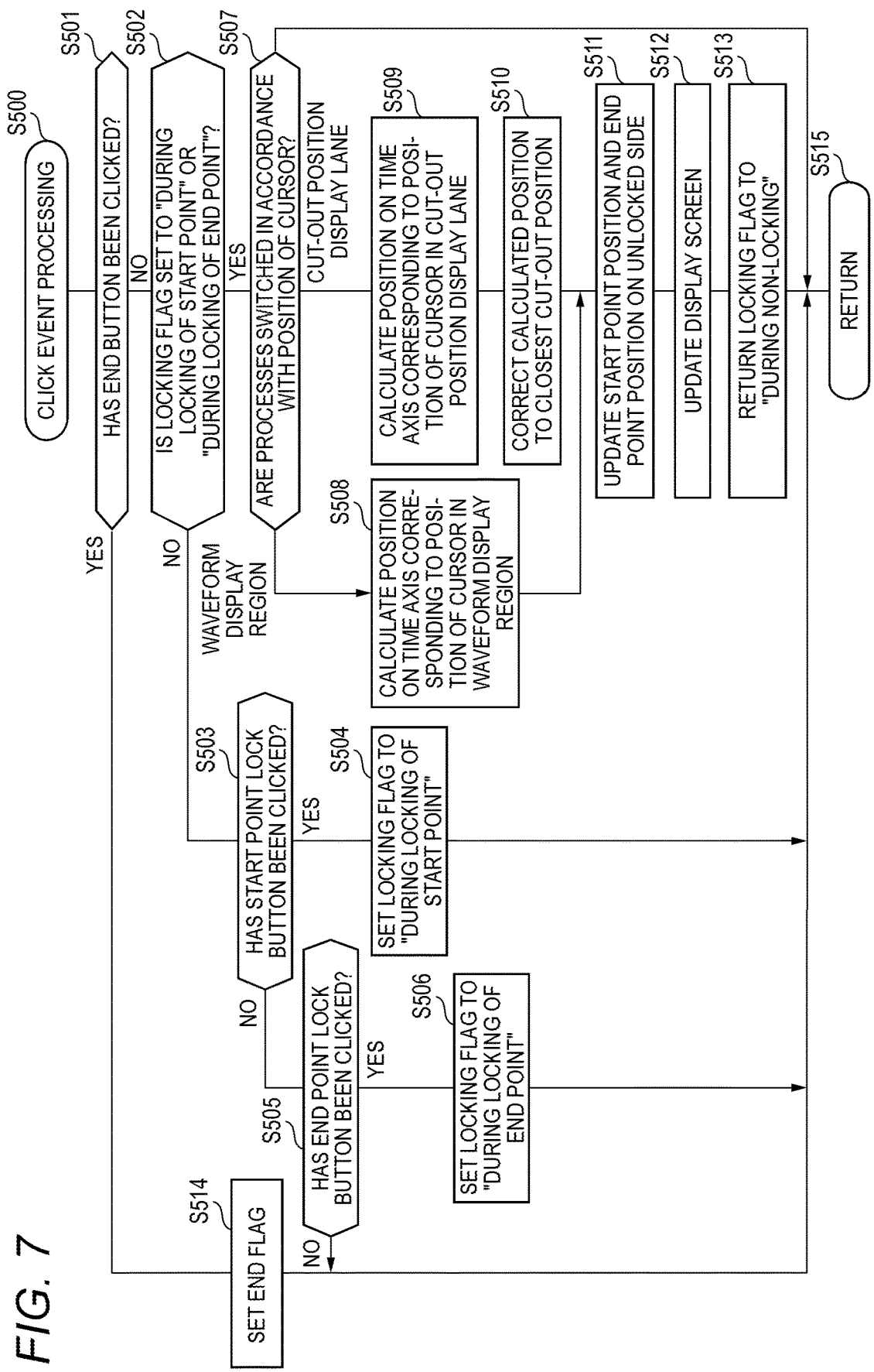
FIG. 7 is a flowchart showing a click event processing routine of the main program.

In this manner, in a case where the moue is clicked again in a state where one of the start point position and the end point position of the cut-out section of data is locked, the click event processing routine of FIG. 7 is executed as described above. As long as not being the click operation of the end button 22c3, it is determined in step S502 mentioned above whether or not the locking flag indicates "during locking of start point" or "during locking of end point". In this case, the locking flag is set to "during locking of start point" or "during locking of end point", the CPU 11 determines "Yes" in step S502 and executes the process of step S507 and the subsequent processes.

The processes of steps S507 to S510 are the same as the processes of steps S201 to S204 of FIG. 4, and are switched to the process of step S508 or the processes of steps S509 and S510 in accordance with the position of the cursor on the display screen of the display device 22 which is included in a click operation event by the determination process of step S507. When the cursor is positioned in the waveform display region 22a, a position on the time axis which corresponds to the position of the cursor in the waveform display region 22*a* is calculated by the process of step S508. When the cursor is positioned in the cut-out position display lane 22*b*, a position on the time axis which corresponds to the position of the cursor in the cut-out position display lane 22*b* is calculated by the process of step S509. In a case of the processes of steps S508 and S509, a position on the time axis which corresponds to the position of the cursor during a click operation of the mouse is calculated. In a case where a position on the time axis is calculated by the process of step S509, a cut-out position closest to the calculated position in the cut-out position display lane 22*b* having the cursor positioned therein is retrieved by the process of step S510, and the calculated position is corrected to the retrieved cut-out position.

After the processes of S508 and S510 are performed, the CPU 11 updates one position (start point position or end point position) which is not locked out of a start point position and an end point position for determining a cut-out section of data to the position of the data on the time axis which is calculated by the process of step S508 or the position of the data on the time axis which is corrected by the process of step S510, in step S511. Thereby, one position out of the start point position and the end point position of the cut-out section of the data which are determined by the first operation mode is updated in a state where the other position is fixed, and thus the cut-out section of the data is corrected.

After the process of step S511 is performed, the CPU 11 updates the cut-out section of the data in the waveform display region 22*a* to the corrected cut-out section and displays the updated section in step S512. The CPU 11 returns the locking flag to a value indicating "during unlocking" in step S513, and ends the click event processing routine in step S515.

In addition, in a case where the end button on the display screen of the display device 22 is clicked, the CPU 11 determines "Yes" in step S501 and sets an end flag in step S514, to thereby end the click event processing routine in step S515. In this case, in step S19 of FIG. 2, the end of cut-out operation of data, that is, the ending of the program is determined on the basis of the end flag, and thus a main program is ended in step S20.

Meanwhile, a keyboard event processing routine of step S18 of FIG. 2 is not directly related to the present invention, and is thus not described above. However, the keyboard event processing routine of step S18 will be simply described. When a user operates the keyboard of the operation unit 21, an operation event related to the operation of the keyboard is acquired in step S12, the CPU 11 progresses the execution of the program to the keyboard event processing routine of step S18 by the switching process of step S13. In the keyboard event processing routine, various operation modes and the like of the data cut-out apparatus 10 which is a computer device are selected.

Audio waveform data within the cut-out section which is determined as described above is used for the generation of different waveform data, the mixing of a plurality of pieces of waveform data, and the like based on repetitive reproduction, analysis, and the modification (change) of music element (a pitch, frequency characteristics, and a sound volume).

According to the embodiment of the present invention which is configured and operated as described above, positional information indicating a position which is designated by the operation of the operation unit 21 (mouse) in any display region among the plurality of display regions 22*a*, 22*a*1, 22*a*2, 22*b*, 22*b*1, 22*b*2, and 22*b*3 is obtained by the process of step S12. Positions L1 and L2 for designating a portion of data corresponding to the obtained positional information are determined by the processes of steps S201 to S204, S401 to S404, and S507 to S510. In this case, the plurality of display regions 22*a*, 22*a*1, 22*a*2, 22*b*, 22*b*1, 22*b*2, and 22*b*3 include the display regions 22*b*, 22*b*1, 22*b*2, and 22*b*3 for designating a plurality of discrete positions of a series of pieces of data in a predetermined direction. When positional information indicating a position in the display regions 22*b*, 22*b*1, 22*b*2, and 22*b*3 for designating the discrete positions is obtained, any one position among a plurality of discrete positions MK, MK1, MK2, and MK3 is determined. Accordingly, user's desired specific positions are set as discrete values in advance, and thus it is extremely simple to designate the user's desired specific positions with a high level of accuracy, and much effort and time are not required to designate the specific positions, thereby allowing the specific positions to be simply designated. In addition, in the above-described embodiment, a cut-out section of pieces of audio waveform data WD, WD1, and WD2 is determined by the determination of both the starting position L1 and the ending position L2 of the cut-out section, and thus the cut-out section is designated in response to a user's will, which provides convenience in cutting out a portion of the pieces of audio waveform data WD, WD1, and WD2.

In addition, in the above-described embodiment, as indicated by the marks MK, MK1, MK2, and MK3, the starting position L1 and the ending position L2 of the cut-out section can be designated on the plurality of cut-out positions display lanes 22*b*1, 22*b*2, and 22*b*3 by providing the plurality of cut-out positions display lanes 22*b*1, 22*b*2, and 22*b*3 in which an onset timing, a beat timing, and a performance sectioning timing of a musical piece for designating a plurality of discrete positions on a time axis at different intervals are displayed in parallel by sharing the time axis with the pieces of audio waveform data WD, WD1, and WD2. Thereby, a user can designate the starting position L1 and/or the ending position L2 of the cut-out section by using three types of discrete specific values, and thus the degree of freedom of designation of a specific position increases. In addition, even when a user designates the starting position L1 and/or the ending position L2 of the cut-out section in the cut-out position display lanes 22*b*1, 22*b*2, and 22*b*3 by operating the operation unit 21 (mark), it is possible to confirm the designated position in association with the pieces of audio waveform data WD, WD1, and WD2 displayed in the waveform display regions 22*a*, 22*a*1, and 22*a*2, which provides convenience in designating a position by a user.

Further, in the above-described embodiment, the waveform display regions 22*a*, 22*a*1, and 22*a*2 and the cut-out position display regions 22*b*, 22*b*1, 22*b*2, and 22*b*3 are provided in a plurality of display regions on the display screen of the display device 22. Thereby, it is possible to use a pointing device such as a mouse for determining a position by moving a pointer on the display screen of the display device 22 as the operation unit 21, to simply configure the operation unit 21 and the display device 22, and to simply obtain positional information regarding a cursor.

Meanwhile, the data cut-out method, the data cut-out apparatus, and the computer program according to the present invention are not limited to the above-described embodiment, and can be appropriately modified.

In the above-described embodiment, two waveform display regions 22*a*1 and 22*a*2 are provided on the display screen of the display device 22 so as to display right and left 2-channel audio waveform data WD1 and WD2. Alternatively, as described above in the operation using FIGS. 9A to 9E, only one waveform display region 22a may be provided on the display screen of the display device 22 so as to display one audio waveform data WD. In addition, three or more waveform display regions may be provided on the display screen of the display device 22 so as to display three or more pieces of audio waveform data. Further, a waveform display region may not be provided on the display screen of the display device 22 so that no audio waveform data is displayed. For example, when a user can perceive the audio waveform data without depending on a visual sense because the audio waveform data to be cut out is short or simple, a cut-out position of the audio waveform data may be designated using only the display of the cut-out position display lane 22b without displaying the audio waveform data on the display screen of the display device 22.

In addition, in the above-described embodiment, the plurality of cut-out positions display lanes 22b1, 22b2, and 22b3 having an onset timing, a beat timing, and a performance sectioning timing of a musical piece for designating a plurality of discrete positions on a time axis at different intervals displayed therein are provided. However, four or more cut-out positions display lanes, different from the plurality of cut-out positions display lanes 22b1, 22b2, and 22b3, having another types of discrete positions displayed therein at different intervals may be further provided. Examples of other types of cut-out positions include a time position indicating a timing such as a measure starting position, a crotchet interval, or an eighth-notes interval, a time position indicating a time from the start of a performance of a musical piece, and the like. In addition, two cut-out display lanes may be provided. Further, only one cut-out display lane may be provided on condition that the waveform display region 22a (22a1, 22a2) is provided.

In addition, in the above-described embodiment, both a starting position L1 and an ending position L2 of a cut-out section of each of pieces of audio waveform data WD, WD1, and WD2 are designated by an operation of dragging a mouse in determining the cut-out section. However, one position out of a starting position L1 and an ending position L2 may be fixed, and the other position may be designated using a mouse without designating both the starting position L1 and the ending position L2, similar to a case where a starting position L1 and an ending position L2 are determined by an operation of clicking a mouse in the above-described embodiment. In this case, the fixed position may be a position which is specified in advance in accordance with a predetermined standard, rather than a starting position L1 or an ending position L2 which is designated by an operation of dragging a mouse as in the above-described embodiment. In addition, one position out of a starting position L1 and an ending position L2 may be determined by a designation operation of a mouse, and the other position may be automatically determined to be a position which is distant from the determined position by a predetermined time.

In addition, in the above-described embodiment, discrete positions at a position closest to the position of a cursor during a down operation or an up operation of a mouse may be determined in determining discrete positions of an onset timing, a beat timing, and a performance sectioning timing using the cut-out position display lanes 22b1, 22b2, and 22b3. Alternatively, discrete positions at a forward position or backward position closest to the position of a cursor during a down operation or an up operation of a mouse may be determined.

In addition, in the above-described embodiment, the waveform display regions 22a, 22a1, and 22a2 may be provided on the display screen of the display device 22 so as to display the pieces of audio waveform data WD, WD1, and WD2 along a time axis, and the elongated cut-out position display lanes 22b, 22b1, 22b2, and 22b3 may be provided along the time axis in parallel with the time axis of the pieces of audio waveform data WD, WD1, and WD2 so as to display marks MK1, MK2, and MK3 indicating discrete cut-out positions along the time axis. However, the cut-out position display lanes 22b, 22b1, 22b2, and 22b3 may not be elongated as long as the cut-out position display lanes correspond to the pieces of audio waveform data WD, WD1, and WD2, and may not be parallel to the time axis of the pieces of audio waveform data WD, WD1, and WD2. In addition, the waveform display regions 22a, 22a1, and 22a2 and the cut-out position display lanes 22b, 22b1, 22b2, and 22b3 may be curved so as to display the pieces of audio waveform data WD, WD1, and WD2 and the marks MK1, MK2, and MK3 indicating discrete cut-out positions along the direction of the curve.

In addition, in the above-described embodiment, the cut-out position display lanes 22b, 22b1, 22b2, and 22b3 are provided below the waveform display regions 22a, 22a1, and 22a2 on the display screen of the display device 22. However, the positions of the cut-out position display lanes 22b, 22b1, 22b2, and 22b3 are not limited thereto, and may be other positions. For example, the cut-out position display lanes 22b, 22b1, 22b2, and 22b3 may be provided above the waveform display regions 22a, 22a1, and 22a2. In addition, some of the plurality of cut-out positions display lanes 22b, 22b1, 22b2, and 22b3 may be provided above the waveform display regions 22a, 22a1, and 22a2, and the other cut-out display lanes may be provided below the waveform display regions 22a, 22a1, and 22a2.

In addition, in the above-described embodiment, the pieces of audio waveform data WD, WD1, and WD2 and the marks MK1, MK2, and MK3 indicating an onset timing, a beat timing, and a performance sectioning timing are displayed in the waveform display regions 22a, 22a1, and 22a2 and the cut-out position display lanes 22b, 22b1, 22b2, and 22b3 on the display screen of the display device 22, and a cut-out position of audio waveform data is designated by an operation of dragging a mouse or a click operation. However, alternatively, waveform display regions and cut-out position display lanes may be displayed on display screens of various display devices so as to display audio waveform data WD, WD1, and WD2 and marks MK1, MK2, and MK3 indicating an onset timing, a beat timing, and a performance sectioning timing, and a touch panel may be provided on the display screen so as to designate a cut-out position by performing a pressing operation on the touch panel using a finger or by performing a pressing operation on the touch panel using an operation member. In addition, not only a touch panel but also another panel capable of detecting a position by the detection of another physical amount, for example, a panel capable of detecting a light irradiation position may be provided on a display screen of a display device, and a cut-out position may be designated by another physical amount.

In addition, it is also possible to omit the display of audio waveform data and cut-out positions even in a case where a display device is used as in the above-described embodiment and a case where a touch panel as in the above-described modification example or another panel is used. For example, when a user can perceive the positions of the audio waveform data and marks MK1, MK2, and MK3 indicating the cut-out positions without depending on a visual sense because the audio waveform data to be cut out and the cut-out positions are short or simple, a cut-out position of the audio waveform data may be designated without displaying the audio waveform data and the marks MK1, MK2, and MK3 indicating the cut-out positions.

In addition, data to be cut out is not limited to audio data, and may be other data such as video data. In a case of video data associated with audio data, it is possible to cut out the video data on the basis of a cut-out position based on the audio data, similar to the above-described embodiment. In addition, it is also possible to cut out video data on the basis of cut-out data specific to video data.

In addition, in the embodiment and various modification examples related to the cut-out of audio waveform data, pieces of audio waveform data WD, WD1, WD2, and WD3 having values varying on a time axis are adopted as a series of pieces of data to be cut out which have values changing along a predetermined direction. However, another series of pieces of data showing variation in various physical amounts may also be adopted as a series of pieces of data. As the series of pieces of data, for example, a series of pieces of data indicating a physical amount of a temperature or a humidity varying depending on a position, a time, or the like, a physical amount indicating a variation in the height of the surface of the earth which varies depending on a position, a physical amount indicating the height of the surface of the water of the sea, a pond, or a river which varies depending on a position, a time, or the like, and the like may also be adopted. In these cases, one type or a plurality of types of discrete cut-out positions for each predetermined distance or one type or a plurality of types of discrete cut-out positions for each predetermined time interval are used as cut-out positions.

In addition, in the embodiment and various modification examples related to the cut-out of audio waveform data, cut-out positions on a time axis in the pieces of audio waveform data WD, WD1, WD2, and WD3 varying along the time axis, that is, cut-out positions on one dimension are determined. However, the present invention may also be applied to the determination of cut-out positions of a series of pieces of data varying on two or more dimensions. For example, the above-mentioned height of the surface of the earth varies depending on a two-dimensional position, and the above-mentioned temperature, humidity, height of the surface of the water, and the like vary on three dimensions depending on a time in addition to a position on two dimensions. Accordingly, in a case where such a physical amount is analyzed, cut-out positions on two or more dimensions may be determined. In a case where a series of pieces of data varies in a three-dimensional space, a head-mounted display capable of perceiving a three-dimensional space position, a motion sensor detecting a user's gesture, or the like may be used.

In a case where a portion of data among a series of pieces of data varying two dimensionally is cut out, for example, a series of pieces of data varying along the longitudinal axial direction and the lateral axial direction are displayed in the central region of a display device. In addition, one of two cut-out position display lanes corresponding to two dimensions is displayed along the longitudinal axis on one of both right and left sides of the displayed series of pieces of data, and the other lane is displayed along the lateral axis on one of both upper and lower sides of the displayed series of pieces of data. On the two cut-out position display lanes, two-dimensional cut-out regions in the series of pieces of data are determined by dragging or clicking a mouse or by touching a touch panel.

Further, in the above-described embodiment, the data cut-out apparatus 10 is constituted by a personal computer device. However, the data cut-out apparatus 10 may be a portable computer device as long as the data cut-out apparatus has a function of a computer.

What is claimed is:

1. A data positioning method of determining cut-out positions for designating a portion of data included in a displayed series of pieces of data which have values varying along a predetermined direction, the data positioning method comprising:
    defining a plurality of regions, wherein each of the plurality of regions corresponds to the predetermined direction and is provided for designating a cut-out position of the displayed series of pieces of data in the predetermined direction;
    displaying the series of pieces of data in a waveform display region among the plurality of regions;
    obtaining first and second positional information indicating positions which are-designated by user operation in any region among the plurality of regions, wherein the plurality of regions include at least one region, which is disposed outside the waveform display region, for designating a plurality of preset discrete cut-out positions of the displayed series of pieces of data in the predetermined direction;
    determining a first cut-out position for designating the portion of data corresponding to the obtained first positional information, wherein the first cut-out position is determined from among the plurality of preset discrete cut-out positions,
    wherein the obtained first positional information indicates a position in the at least one region, which is disposed outside the waveform display region, for designating the plurality of preset discrete cut-out positions;
    determining a second cut-out position for designating the portion of data corresponding to the obtained second positional information,
    wherein the second cut-out position is determined from among a plurality of continuous positions,
    wherein the obtained second positional information indicates a position in the waveform display region,
    wherein the first and second cut-out positions designate endpoints of the portion of data corresponding to the obtained first and second positional information,
    wherein the first and second cut-out positions are determined using a single, continuous drag of an operation unit; and
    displaying visual indication of the designated portion of data.

2. The data positioning method according to claim 1, wherein the first cut-out position for designating the portion of data includes either a start point position or an end point position of the portion of data.

3. The data positioning method according to claim 2, wherein the first cut-out position is determined to be a discrete cut-out position close to the obtained first positional information.

4. The data positioning method according to claim 1, wherein the plurality of regions include at least two regions, which are disposed outside the waveform display region, for designating the plurality of preset discrete cut-out positions of the series of pieces of data in the predetermined direction at different intervals, respectively.

5. The data positioning method according to claim 1, wherein the plurality of regions corresponds to a plurality of display regions of a display device.

6. The data positioning method according to claim 5, further comprising:
displaying a plurality of different images for designating the plurality of preset discrete cut-out positions of the displayed series of pieces of data in the predetermined direction in at least two display regions of the display device, respectively, which are disposed outside the waveform display region,
wherein the obtained first positional information indicates a position which is designated by the user operation in any display region among the at least two display regions.

7. The data positioning method according to claim 6, wherein the series of pieces of data is displayed in the waveform display region as images for designating cut-out positions of the series of pieces of data in the predetermined direction.

8. The data positioning method according to claim 7, wherein the series of pieces of data is audio waveform data sampled with a lapse of time.

9. The data positioning method according to claim 6, wherein the series of pieces of data is audio waveform data sampled with a lapse of time, and
wherein the plurality of different images for designating the plurality of preset discrete cut-out positions are displayed at different intervals in the at least two display regions of the display device, respectively, so as to be along a common time axis and in a consistent direction.

10. The data positioning method according to claim 9, wherein the plurality of different images displayed in the at least two display regions of the display device include an image indicating an onset timing of sound signal in the audio waveform data, an image indicating a beat timing in the audio waveform data, or an image indicating a performance sectioning timing between a main part and a prelude part or a postlude part of a musical piece.

11. The data positioning method according to claim 6,
wherein displaying the plurality of different images for designating the plurality of preset discrete cut-out positions includes displaying marks which indicate the plurality of preset discrete cut-out positions in the at least two display regions.

12. The data positioning method according to claim 1, further comprising:
cutting out the portion of data included in the series of pieces of data based on the first and second cut-out positions.

13. A data positioning apparatus that determines cut-out positions for designating a portion of data included in a displayed series of pieces of data which have values varying along a predetermined direction, the data positioning apparatus comprising:
a display device having a plurality of display regions, and
a computer device and a computer-readable storage medium configured to store instructions that cause the computer device to:
define a plurality of regions, wherein each of the plurality of regions corresponds to the predetermined direction and is provided for designating a cut-out position of the displayed series of pieces of data in the predetermined direction;
display the series of pieces of data in a waveform display region among the plurality of regions;
obtain first and second positional information indicating positions which are designated by user operation in any region among the plurality of regions, wherein the plurality of regions include at least one region, which is disposed outside the waveform display region, for designating a plurality of preset discrete cut-out positions of the displayed series of pieces of data in the predetermined direction;
determine a first cut-out position for designating the portion of data corresponding to the obtained first positional information, wherein the first cut-out position is determined from among the plurality of preset discrete cut-out positions,
wherein the obtained first positional information indicates a position in the at least one region, which is disposed outside the waveform display region, for designating the plurality of preset discrete cut-out positions;
determine a second cut-out position for designating the portion of data corresponding to the obtained second positional information,
wherein the second cut-out position is determined from among a plurality of continuous positions,
wherein the obtained second positional information indicates a position in the waveform display region,
wherein the first and second cut-out positions designate endpoints of the portion of data corresponding to the obtained first and second positional information,
wherein the first and second cut-out positions are determined using a single, continuous drag of an operation unit; and
display visual indication of the designated portion of data.

14. The data positioning apparatus according to claim 13,
wherein the display device displays a plurality of different images for designating the plurality of preset discrete cut-out positions of the displayed series of pieces of data in the predetermined direction in at least two display regions, respectively, which are disposed outside the waveform display region, and
wherein the obtained first positional information indicates a position which is designated by the user operation in any display region among the at least two display regions.

15. The data positioning apparatus according to claim 14, wherein the series of pieces of data is displayed in the waveform display region as images for designating cut-out positions of the series of pieces of data in the predetermined direction.

16. The data positioning apparatus according to claim 15, wherein the series of pieces of data is audio waveform data sampled with a lapse of time.

17. The data positioning apparatus according to claim 14, wherein the series of pieces of data is audio waveform data sampled with a lapse of time, and
wherein the display device displays the plurality of different images for designating the plurality of preset discrete cut-out positions at different intervals in the at least two display regions, respectively, so as to be along a common time axis and in a consistent direction.

18. A non-transitory computer-readable medium, in which is stored a computer program for determining a-cut-out positions for designating a portion of data included in a displayed series of pieces of data which have values varying along a predetermined direction, the computer program causing a computer to execute:
defining a plurality of regions, wherein each of the plurality of regions corresponds to the predetermined direction and is provided for designating a cut-out position of the displayed series of pieces of data in the predetermined direction;

displaying the series of pieces of data in a waveform display region among the plurality of regions;

obtaining first and second positional information indicating positions which are-designated by user operation in any region among the plurality of regions, wherein the plurality of regions include at least one region, which is disposed outside the waveform display region, for designating a plurality of preset discrete cut-out positions of the displayed series of pieces of data in the predetermined direction;

determining first cut-out position for designating the portion of data corresponding to the obtained first positional information, wherein the first cut-out position is determined from among the plurality of preset discrete cut-out positions, wherein the obtained first positional information indicates a position in the at least one region, which is disposed outside the waveform display region, for designating the plurality of preset discrete cut-out positions;

determining a second cut-out position for designating the portion of data corresponding to the obtained second positional information, wherein the second cut-out position is determined from among a plurality of continuous positions, wherein the obtained second positional information indicates a position in the waveform display region, wherein the first and second cut-out positions designate endpoints of the portion of data corresponding to the obtained first and second positional information, wherein the first and second cut-out positions are determined using a single, continuous drag of an operation unit; and displaying visual indication of the designated portion of data.

\* \* \* \* \*